COLOR SELECTION CIRCUIT FOR TELEVISION

Filed Aug. 23, 1951

INVENTOR
Nathan Rynn
BY
ATTORNEY

United States Patent Office 2,738,378

Patented Mar. 13, 1956

2,738,378

COLOR SELECTION CIRCUIT FOR TELEVISION

Nathan Rynn, Princeton, N. J., assignor to Radio Corporation of America, a corporation of Delaware Application August 23, 1951, Serial No. 243,247

The terminal 15 years of the term of the patent to be granted has been disclaimed 6 Claims. (Cl. 178—5.4)

Figures 1, 2:
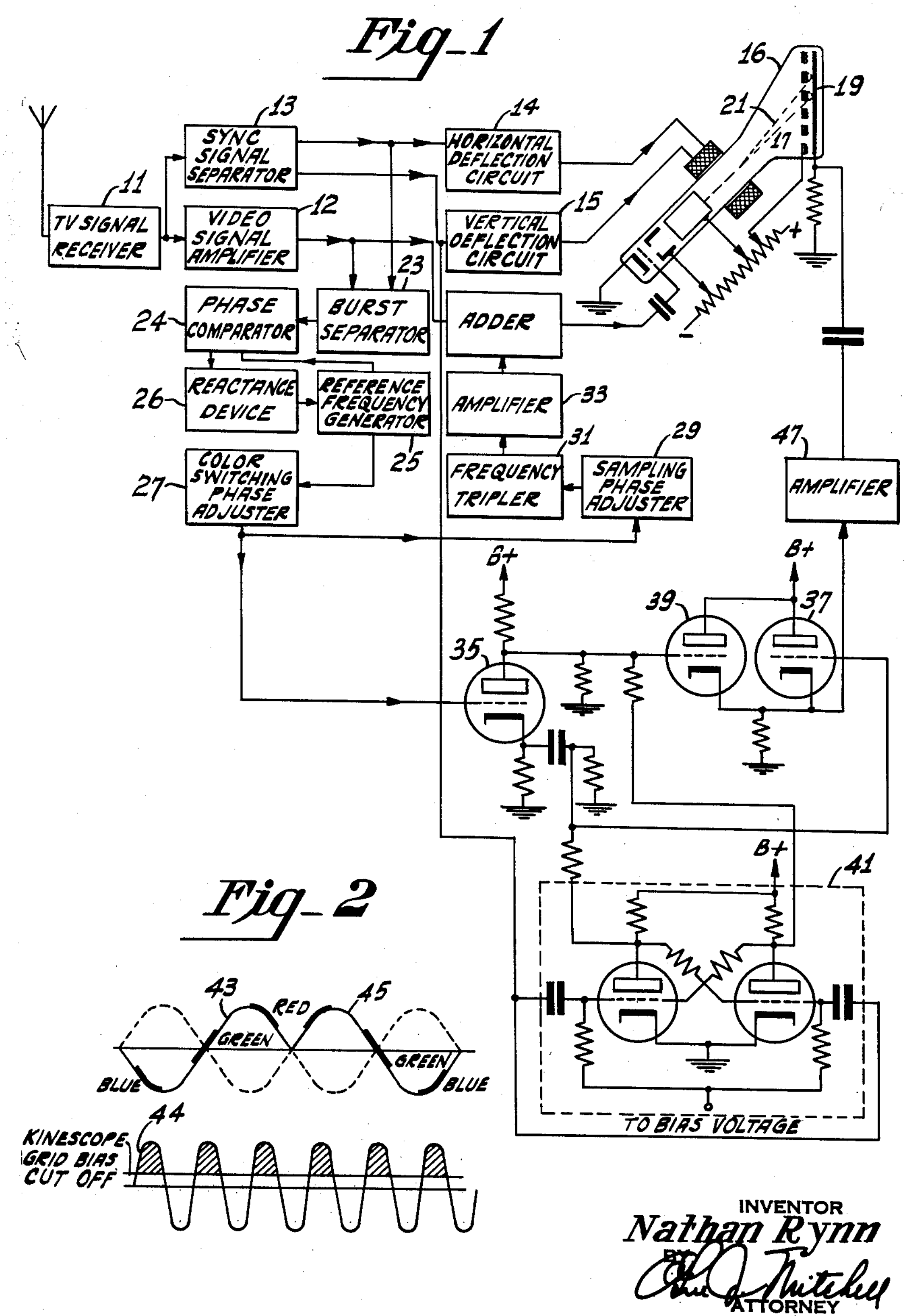

This invention relates to color television and particularly to color selection circuits in television apparatus.

In a color television system operating in accordance with the well-known multiplex principles, the relatively high frequency components of those video signals representing most of the brightness detail are transmitted substantially in the usual manner for black and white video signals. In such systems only the relatively low frequency components of those video signals representing the hue and chroma of the different elemental areas of the subject are transmitted. Both of these signal components are transmitted in the same channel having a fixed frequency band. Such transmission is effected by the multiplexing process. In carrying out such a process, there is produced a phase-and-amplitude-modulated sub-carrier wave having a nominal frequency within the frequency pass band of the channel. This sub-carrier is modulated in phase to represent the hue and in amplitude to represent the chroma of the subject color.

The nominal frequency of the sub-carrier wave is chosen usually to be equal to one of the higher frequencies capable of being transmitted within the band width of the channel. Accordingly, the higher frequency color video signal components which are phase-modulated on the sub-carrier are beyond the pass band of the channel and accordingly, are not transmitted. In order that such signal information be transmitted at least partially, it has been proposed to reverse periodically the sense in which the color video signals are modulated on the sub-carrier wave. By this means, all of the color information of the subject is transmitted as the lower side band of the sub-carrier wave at least half the time. One system embodying the color phase alternation as just described forms the subject matter of a copending United States application of George C. Sziklai, Alfred C. Schroeder, and Alda V. Bedford, Serial No. 220,622, filed April 12, 1951, and entitled "Multiplex Signalling Systems."

Color television tubes have been proposed, in which the color selection is accomplished by applying a color switching voltage to an electrode positioned in the vicinity of the screen, the color selection thus taking place after the deflection of the beam. An early tube of this type is disclosed in U. S. Patent 2,446,791, issued August 10, 1948, to Alfred C. Schroeder.

It is an object of the present invention to provide improved apparatus for effecting the periodic alternation of the sense in which the color selection takes place in color television apparatus.

It is another object of this invention to provide improved apparatus for effecting color phase alternation in color television apparatus employing a cathode ray tube in which color selection takes place after the deflection of the cathode ray beam, and in which said color selection is effected by applying a color switching voltage to a color switching electrode positioned in the vicinity of the screen.

In its broadest aspect, the present invention provides apparatus for changing periodically the phase of the color switching voltage, this change occuring at the color phase alternation rate.

According to the illustrated embodiment of the present invention, two color switching voltages, which are 180° out of phase with respect to each other, are impressed upon the input electrodes of two switching tubes. These switching tubes are rendered alternately conductive at the rate of the reversal of the color switching order. An Eccles-Jordan trigger circuit, triggered by the vertical sync pulses, provides a convenient means for rendering the switching tubes alternately conductive. The desired color switching voltage, effecting the periodic alternation of the order in which the color selection takes place, is obtained at the output electrodes of the switching tubes.

Other and incidental objects of the present invention will be apparent to those skilled in the art from a reading of the following specification and an inspection of the following drawings in which:

Fig. 1 shows by block and circuit diagram, a color television receiver employing an embodiment of the invention; and Fig. 2 shows the waveform of a suitable color switching voltage.

Reference is now made to Figure 1 which shows a circuit according to the present invention embodied in a color television receiver of a type with which the invention is particularly usely. It is assumed that the circuit according to the present invention is embodied in a three-color television system operating in accordance with the multiplex principle as disclosed in an article entitled "A six-megacycle compatible high-definition color television system" published in the RCA Review for December 1949, volume X, No. 4, page 504. Such a system also forms the subject matter of a copending U. S. application of John Evans, Serial No. 113,384, filed August 20, 1949, and entitled "Color Television." In such a system the video signals that are generated, transmitted and received, represent each of the three primary colors of a multiplicity of successive elemental areas of the subject of which an image is to be reproduced. The rate at which the video signals representing each of the different image colors are repeated is designated as the color sampling frequency. In the present system, for example, this frequency is that of a sub-carrier wave which is modulated in phase to represent the hue of the subject color and in amplitude to represent the color saturation or chroma as previously indicated. Such a phase-and-amplitude-modulated sub-carrier wave is transmitted substantially simultaneously over the same channel with a brightness signal which is represented as an amplitude modulation of the radiated carrier wave.

Such a carrier wave is received and impressed upon a television signal receiver 11 of the drawing. It will be understood that this apparatus may be entirely conventional equipment such as found in present black and white television receivers. Briefly, it comprises carrier wave amplifying apparatus, a frequency converter and a signal detector by means of which the video and control signals, such as the synchronizing pulses, are recovered from the carrier wave. Accordingly, it will be understood that the output circuits of the receiver 11 may be coupled in a conventional manner to a video signal amplifier 12 and to a sync signal separator 13.

The video signal amplifier 12 functions to amplify the complete video signal including the brightness component and the color component represented by the phase-and-amplitude-modulated sub-carrier wave. The sync signal separator 13 functions in the usual way to separate the horizontal and vertical synchronizing pulses from the video signals and also from one another. The separated horizontal and vertical synchronizing pulses are impressed upon the horizontal deflection circuit 14 and the vertical deflection circuit 15 respectively. These deflection circuits also function in the usual manner to produce sawtooth wave energy at both the horizontal and vertical deflection frequencies for control of the electron beam deflection in an image reproducing device.

In the present case the image reproducing device is a tricolor kinescope 16. The form of kinescope illustrated here is substantially of the type disclosed in a copending U. S. patent application of Paul K. Weimer, Serial Number 226,837, filed May 17, 1951, and entitled "Improvement in Post-Deflected Cathode-Ray Tubes," now U. S. Patent 2,728,025, issued December 20, 1955.

Such a kinescope uses a single electron gun. The screen assembly comprises a multi-apertured metal plate 17 coated on the front side with red, green, and blue phosphor strips and mounted parallel to a color switching electrode 19 comprising a glass plate coated with a transparent conductive film. An electron beam 21 scans the back of the metal plate at an angle of incidence of approximately forty-five degrees. The portion of the beam passing through the apertures is reflected by the electric field between plates 17 and 19 causing it to fall back on one set of phosphor strips. The beam 21 is shifted from one color to another by varying the potential of the glass reflector plate 19.

In order that the receiving apparatus such as shown in Figure 1 be capable of operating synchronously with the associated transmitting apparatus, not only for the deflection of the electron beam of the kinescope 16 to scan the usual raster, but also with respect to the phase demodulation of the received phase-and-amplitude-modulated sub-carrier wave, there is transmitted as part of the conventional composite television signal a burst of energy consisting of several cycles at the sub-carrier wave frequency. This burst of energy is transmitted during the blanking intervals and immediately following the horizontal synchronizing pulses. More complete disclosures of this and other types of synchronizing systems which may be used in the practice of the present invention may be found in a publication entitled "Recent Development in Color Synchronization in the RCA Color Television System," issued February 1950 by the Radio Corporation of America. Figure 9 of this publication refers particularly to the receiver apparatus. The burst type of color synchronizing signal also forms the subject matter of a copending U. S. application of Alda V. Bedford, Serial No. 143,800, filed February 11, 1950, and entitled "Synchronizing Apparatus," now U. S. Patent 2,782,872, issued December 27, 1955.

In accordance with the usual practice, this burst of the sub-carrier wave frequency is superimposed upon the horizontal blanking pedestal in the "back porch" region. Accordingly, the receiver shown in the drawing includes a burst separator apparatus 23 which is coupled to the output circuit of the video signal amplifier 12. The burst separator is essentially a gating device. Accordingly, it is rendered operative only during the back porch intervals of the composite television signal under the control of horizontal synchronizing pulses derived from the sync signal separator 13. By means of such apparatus controlled in the manner described, there is produced in its output circuit a short burst of energy having the frequency of the sub-carrier wave. This energy burst is impressed upon a phase comparator 24 which also receives a wave of substantially the same frequency from a reference frequency wave generator 25. The phase difference between the separated energy burst and the wave from the generator 25 is detected by the phase comparator 24. Such a phase difference is a result of a deviation of the generator 25 from the frequency of the received sub-carrier wave. The output circuit of the phase comparator 24, in which there is developed a voltage representative of the magnitude and sense of the phase difference, is coupled to a reactance device 26 which is coupled to the reference frequency generator 25 in the usual manner for controlling the frequency of the locally generated wave. This frequency is usually 3.58 megacycles.

The output of the reference frequency generator 25 is coupled to a color switching phase adjuster 27. This phase adjuster 27 is designed to adjust the phase of the 3.58 megacycles signal so that it is in phase with the transmitter sampler: this allows a green portion of the picture to appear as green, a red portion as red, and so on.

Let us now turn to Figure 2, which shows a form of suitable color switching voltage 43. This sine wave, which has a frequency of 3.58 mc., is applied to the color switching electrode 19 of kinescope 16. The third harmonic 44 of the 3.58 mc. sine wave, which is a 10.74 mc. sine wave, is used to blank the beam with proper timing to preserve the sequence of the multiplex television signal. If the beam were not switched on and off, the center color, which in this case is green, would be repeated twice for every one of the other two. This type of switching is described in a copending U. S. application of Paul K. Weimer, Serial Number 134,453, filed December 22, 1949, and entitled "Color Television Reproducing Systems," now U. S. Patent 2,650,264, issued August 25, 1953.

Going back to Figure 1, the output of the phase adjuster 27 is fed through a sampling phase adjuster 29, a frequency tripler 31, and an amplifier 33 to an adder to which is also fed the output of the video signal amplifier 12. The output of the adder comprises the 10.74 mc. beam blanking signals and the video signals.

In accordance with the illustrated embodiment of the present invention, the output of the phase adjuster 27 is fed to the input electrode of an electron tube 35. The cathode of tube 35 is connected to the grid of a switching tube 37, and the anode of tube 35 is connected to the grid of a switching tube 39. Tube 35 has thus two outputs which are 180° out of phase, and each of these two outputs are applied to the grid of a tube.

The vertical sync pulse output of sync signal separator 13 is used to trigger an Eccles-Jordan trigger circuit 41. This type of circuit, sometimes known as a "flip-flop" circuit, is well known to those skilled in the art, and is described on pages 192–194 of "Radar Electronic Fundamentals" published in June 1944 by the Bureau of Ships of the Navy Department in Washington, D. C. The outputs of the trigger circuit 41 are applied to the grids of switching tubes 37 and 39 respectively. Tubes 37 and 39 thus function as gates: the waveform 43 of Fig. 2 is present on the grid of 39, while the wave form 45 of Fig. 2, which is 180° out of phase with the waveform 43, is present on the grid of tube 37. These tubes are alternately triggered by the flip-flop circuit, which is itself triggered by the vertical sync, so that the output at the common cathodes of tubes 37 and 39 is waveform 43 for the duration of one field, and waveform 45 for the duration of the next. This output is applied through amplifier 47 to the reflector plate 19 of kinescope 16.

The color matching sequence will thus be blue-green-red during one field interval, red-green-blue during the succeeding field interval, etc., and color phase alternation will thus have been achieved.

Having described the invention, what is claimed is:

1. In a color television apparatus including a cathode ray tube comprising a color switching electrode and in which color selection takes place after the normal scanning deflection of the cathode ray beam: means to obtain a first color switching voltage such that color selection takes place in a first order, means to obtain a second color switching voltage differing in phase from said first color switching voltage such that color selection takes place in a second order differing from said first order, and means to alternately apply said first and second switching voltages to said color switching electrode, said last-named means including a pair of gating tubes coupled to said color switching electrode, means for applying each of said color switching voltages to a respective one of said gating tubes, and means for alternately triggering said pair of gating tubes.

2. In a color television apparatus including a cathode ray tube comprising a color switching electrode and in which color selection takes place after the normal scanning deflection of the cathode ray beam: means to obtain a first color switching voltage such that color selection takes place in a first order, means to obtain a second color switching voltage in phase opposition to said first color switching voltage such that color selection takes place in a second order which is the reverse of said first order, and means to alternately apply said first and second switching voltages to said color switching electrode, said last-named means including a pair of gating tubes coupled to said color switching electrode, means for separately applying each of said color switching voltages to a different one of said gating tubes, and means for alternately actuating said pair of gating tubes at a predetermined periodic rate.

3. In a color television receiver adapted to receive color television signals having a predetermined field rate, said receiver including a cathode ray tube comprising a color switching electrode and in which color selection takes place after the normal scanning deflection of the cathode ray beam: means to obtain a first color switching voltage, means to obtain a second color switching voltage in phase opposition to said first color switching voltage, first and second electron tubes having input and output electrodes, means to apply said first and second switching voltages to the input electrodes of said first and second electron tubes respectively, means to render said first and second electron tubes alternately conductive and means connecting the output electrodes of said first and second electron tubes to said color switching electrode.

4. The invention according to claim 3 wherein said first and second electron tubes are rendered alternately conductive at said field rate.

5. The invention according to claim 3 wherein said means to render said first and second electron tubes alternately conductive include an Eccles-Jordan trigger circuit.

6. In a color television apparatus including a cathode ray tube comprising a color switching electrode and in which color selection takes place after the normal scanning deflection of the cathode ray beam: the combination comprising a source of color switching signals, phase-splitting means coupled to said source to provide a first color switching voltage such that color selection takes place in a first order and a second color switching voltage such that color selection takes place in a second order differing from said first order, and means to alternately apply said first and second switching voltages to said color switching electrode, said last-named means including respective gating means for each of said color switching voltages, said gating means being triggered in alternation at a predetermined periodic rate.

References Cited in the file of this patent

UNITED STATES PATENTS

| | | |
|---|---|---|
| 2,518,200 | Sziklai | Aug. 8, 1950 |
| 2,529,485 | Chew | Nov. 14, 1950 |
| 2,532,511 | Okolicsanyi | Dec. 5, 1950 |
| 2,580,073 | Burton | Dec. 25, 1951 |
| 2,617,876 | Rose | Nov. 11, 1952 |
| 2,621,245 | Kell | Dec. 9, 1952 |
| 2,650,264 | Weimer | Aug. 25, 1953 |
| 2,657,257 | Lesti | Oct. 27, 1953 |